United States Patent
Won et al.

(10) Patent No.: US 9,008,215 B2
(45) Date of Patent: Apr. 14, 2015

(54) METHODS, SYSTEMS, AND COMPUTER PROGRAM PRODUCTS FOR ASYMMETRIC MULTIMODE INTERCONNECT

(75) Inventors: Chanyoun Won, Westborough, MA (US); Hoon Seok Kim, Cheong-Ju (KR); Paul D. Franzon, New Hill, NC (US); Zhuo Yan, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 235 days.

(21) Appl. No.: 13/538,448

(22) Filed: Jun. 29, 2012

(65) Prior Publication Data

US 2014/0003549 A1 Jan. 2, 2014

(51) Int. Cl.
*H04L 25/49* (2006.01)

(52) U.S. Cl.
CPC ............ *H04L 25/49* (2013.01); *H04L 25/4906* (2013.01); *H04L 25/4917* (2013.01)

(58) Field of Classification Search
USPC .......................................... 375/286, 295, 340
See application file for complete search history.

(56) References Cited

U.S. PATENT DOCUMENTS

| | | | |
|---|---|---|---|
| 6,292,143 B1 * | 9/2001 | Romanofsky | .......... 343/700 MS |
| 7,362,130 B2 | 4/2008 | Broyde et al. | |
| 7,408,426 B2 | 8/2008 | Broyde et al. | |
| 7,764,083 B2 | 7/2010 | Broyde et al. | |
| 8,903,010 B2 | 12/2014 | Won et al. | |
| 2003/0123877 A1 * | 7/2003 | Lo | ................................... 398/34 |
| 2004/0213347 A1 | 10/2004 | Kajiwara | |
| 2005/0057297 A1 | 3/2005 | Gamble | |
| 2007/0011716 A1 * | 1/2007 | Koslov et al. | .................. 725/135 |
| 2008/0049780 A1 * | 2/2008 | Whitehead | .................... 370/463 |
| 2009/0047025 A1 * | 2/2009 | Hong et al. | ..................... 398/135 |
| 2010/0246585 A1 * | 9/2010 | Mantri et al. | .................. 370/394 |
| 2012/0114024 A1 * | 5/2012 | Mielczarek et al. | .......... 375/219 |

(Continued)

OTHER PUBLICATIONS

Final Office Action for U.S. Appl. No. 13/469,059 (May 19, 2014).

(Continued)

*Primary Examiner* — Michael Neff
(74) *Attorney, Agent, or Firm* — Jenkins, Wilson, Taylor & Hunt, P.A.

(57) ABSTRACT

Methods, systems, and computer readable media for asymmetric multimode interconnect (MMI) are disclosed. According to one aspect, a system for receiver-side asymmetric MMI includes a receiver that receives binary-encoded input signals from a multichannel interconnect, encodes the received binary-encoded signals according to a multimode encoding equation to produce multimode-encoded signals having voltage levels according to the multimode encoding equation, adjusts the timing of the multimode-encoded signals to compensate for multichannel interconnect channel delays to produce delay-adjusted multimode-encoded signals, and decodes the delay-adjusted multimode-encoded signals according to a multimode decoding equation to produce binary-encoded output signals. According to another aspect, a system for transmitter-side asymmetric MMI includes a transmitter that receives binary-encoded input signals, pre-adjusts the timing of the input signals to compensate for expected multichannel interconnect channel delays, multimode-encodes the timing-compensated binary-encoded input signals, multimode-decodes the multimode-encoded signals, and transmits the multimode-decoded signals over the multichannel interconnect.

23 Claims, 12 Drawing Sheets

(56) References Cited

U.S. PATENT DOCUMENTS

2013/0117790 A1 5/2013 Coban et al.
2013/0300498 A1* 11/2013 Won et al. ............ 330/124 R

OTHER PUBLICATIONS

Non-Final Office Action for U.S. Appl. No. 13/469,059 (Nov. 18, 2013).

Commonly Assigned, Co-pending U.S. Appl. No. 13/469,059, titled "Methods, Systems, and Computer Program Products for Low Power Multimode Interconnect for Lossy and Tightly Coupled Multi-Channel." (unpublished, filed May 10, 2012).

Broyde, "Clear as a Bell [Controlling Crosstalk in Uniform Interconnections]," IEEE Circuits & Devices Magazine, vol. 20, issue 6, pp. 29-37 (Nov./Dec. 2004).

Choi et al., "Multimode Transceiver for High-Density Interconnects: Measurement and Validation," Electronic Components and Technology Conference, pp. 1733-1738 (2010).

Choi et al., "Multimode signaling on non-ideal channels," in Proc. IEEE 17th Topical Meeting on Electrical Performance of Electronic Packaging (EPEP), pp. 51-54, San Jose, CA (Oct. 2008).

Notice of Allowance and Fee(s) due for U.S. Appl. No. 13/469,059 (Aug. 8, 2014).

\* cited by examiner

METHODS, SYSTEMS, AND COMPUTER PROGRAM PRODUCTS FOR ASYMMETRIC MULTIMODE INTERCONNECT

TECHNICAL FIELD

The subject matter described herein relates to methods and systems for providing high-speed communication between electronic devices in a system, multichip module, printed circuit board, and the like. More particularly, the subject matter described herein relates to methods, systems, and computer readable media for asymmetric multimode interconnect.

BACKGROUND

An interconnect system is a system by which information is communicated between distinct entities, such as between computer chips on a printed circuit board (PCB) or multi-chip module (MCM). The term "interconnect", when used as a noun, refers to the medium by which the information is communicated. An interconnect may be an electrical connection, such as a wire or signal trace on a PCB or MCM, an optical connection, such as an optical fiber, or a wireless connection, such as a radio-frequency link. As used herein, however, the term "interconnect system" refers to a system that communicates information or data via a physical, electrical connection.

A binary interconnect system transmits information by imposing one of two possible states onto each interconnect. For example, a binary interconnect system may impose one of two voltages onto each interconnect, or may impose current through the interconnect, where the current is one of two levels or one of two directions. In a binary interconnect system, the two possible states may represent two logical values, e.g., logical zero and logical one.

A multi-mode interconnect (MMI) system transmits information by coding bits onto a set of levels distributed through a multi-channel interconnection, such as a wire bundle containing more than 2 wires. This approach uses modal decomposition to formulate a CODEC that eliminates noise by generating signals that use only fundamental modes of propagation in the transmission line bundle. MMI uses encoding and decoding matrices, referred to as T and $T^{-1}$, respectively that constitute the diagonal LC matrix that represents the self-inductances and capacitances of the transmission lines that make up the multichannel interconnect. The key to crosstalk cancellation is the selection of T and $T^{-1}$ such that the signals are transmitted only using the fundamental eigenmodes of the ZY and YZ matrices, where Z is the per-unit-length impedance matrix and Y is the per-unit-length admittance matrix.

FIG. 1 is a block diagram illustrating a conventional multimode interconnect implementation 100, which includes an encoder 102, a multichannel interconnect 104, and a decoder 106. Encoder 102 encodes transmit binary data 108 into transmitted MM data 110, which is sent through interconnect 104. At the other end of interconnect 104, received MM data 112 includes distortion caused by cross-talk within interconnect 104. Received MM data 112 is decoded by decoder 106 to create received binary data 114, which is a recreation of transmit binary data 108.

There are disadvantages to conventional multimode interconnect systems, however. The entities on each side of interconnect 104 must agree on an encoding/decoding scheme, and each entity has the burden to perform its part and to perform it correctly. Conventional systems such as the one illustrated in FIG. 1 divide that burden, with the transmitter responsible for encoding and the receiver responsible for decoding. Such systems are herein referred to as "symmetric", because each side has part of the burden and because the two parts have to be compatible with each other, i.e., the decoder used by the receiver must be the inverse of the encoder used by the transmitter. In symmetric systems, both transmitter and receiver must have the capability to perform what may be complex or computationally expensive encoding and decoding operations, respectively. Moreover, modification of the algorithm used at one end of the interconnect usually requires a similar modification at the other end of the interconnect. Because of this, any change to one of the transmitter/receiver pair of devices usually forces a change to the other of the pair of devices. This results in a tendency for the protocols, transforms, algorithms and/or mathematical operations surrounding interconnects to be static and may even hinder efforts to develop better algorithms.

Accordingly, in light of these disadvantages associated with conventional, symmetric multimode interconnect, there exists a need for methods, systems, and computer readable media for asymmetric multimode interconnect.

SUMMARY

According to one aspect, the subject matter described herein includes a system for asymmetric multimode interconnect. The system includes a receiver for receiving binary-encoded input signals from a multichannel interconnect. The receiver includes a multimode encoder, connected to the second end of the multichannel interconnect, that receives binary-encoded signals that correspond to binary-encoded input signals that were provided to the first end of the multichannel interconnect and encodes the received binary-encoded signals according to a multimode encoding equation to produce multimode-encoded signals having voltage levels according to the multimode encoding equation. A timing adjustment block adjusts the timing of the multimode-encoded signals to compensate for channel delays of each channel of the multichannel interconnect, which produces delay-adjusted multimode-encoded signals. A multimode decoder decodes the delay-adjusted multimode-encoded signals according to a multimode decoding equation to produce binary-encoded output signals.

According to another aspect, the subject matter described herein includes a system for asymmetric multimode interconnect. The system includes a transmitter for transmitting data over a multichannel interconnect having a first end and a second end. The transmitter includes a timing compensation block for receiving binary-encoded input signals and producing timing-compensated binary encoded input signals; a multimode encoder for encoding the timing-compensated binary encoded input signals according to a multimode encoding equation to produce multimode-encoded signals having voltage levels according to the multimode encoding equation; and a multimode decoder for decoding the multimode-encoded signals according to a multimode decoding equation to produce multimode-decoded signals and for transmitting the multimode-decoded signals over the multichannel interconnect.

According to yet another aspect, the subject matter described herein includes a method for asymmetric multimode interconnect. The method includes, at a transmitter connected to the first end of a multichannel interconnect having a first end and a second end: receiving a plurality of binary-encoded input signals to be transmitted over the multichannel interconnect; adjusting the timing of the plurality of binary-encoded input signals to compensate for channel delays of each channel of the multichannel interconnect; encoding the timing-adjusted binary encoded input signals according to a multimode encoding equation to produce multimode-encoded signals having voltage levels according to the multimode encoding equation; decoding the multimode-encoded signals according to a multimode decoding equation to produce multimode-decoded signals; and transmitting the multimode-decoded signals over the multichannel interconnect.

According to yet another aspect, the subject matter described herein includes a method for asymmetric multimode interconnect. The method includes, at a transmitter connected to the first end of a multichannel interconnect having a first end and a second end: receiving a plurality of binary-encoded input signals to be transmitted over the multichannel interconnect; adjusting the timing of the plurality of binary-encoded input signals to compensate for channel delays of each channel of the multichannel interconnect; encoding the timing-adjusted binary encoded input signals according to a multimode encoding equation to produce multimode-encoded signals having voltage levels according to the multimode encoding equation; decoding the multimode-encoded signals according to a multimode decoding equation to produce multimode-decoded signals; and transmitting the multimode-decoded signals over the multichannel interconnect.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for asymmetric multimode interconnect are provided. Reference will now be made in detail to exemplary embodiments of the present invention, examples of which are illustrated in the accompanying drawings. Wherever possible, the same reference numbers will be used throughout the drawings to refer to the same or like parts.

In contrast to conventional, symmetric multimode interconnect systems and methods, the subject matter described herein includes asymmetric multimode interconnect. Two types of asymmetric multimode interconnect are described in detail: receiver-side asymmetric multimode interconnect and transmitter-side asymmetric multimode interconnect. In receiver-side asymmetric multimode interconnect, the encoder has been moved from its conventional location on the transmit side of the interconnect to the receiver side, e.g., out of the transmitter and into the receiver. As a result, the transmitter can send raw, unencoded binary data. In transmitter-side asymmetric multimode interconnect, the decoder has been moved from its conventional location on the receive side of the interconnect to the transmit side, e.g., out of the receiver and into the transmitter. As a result, the receiver can expect to receive raw, unencoded binary data from the transmitter. For this reason, asymmetric multimode interconnect may also be referred to as "binary mode interconnect".

Figure 2A:
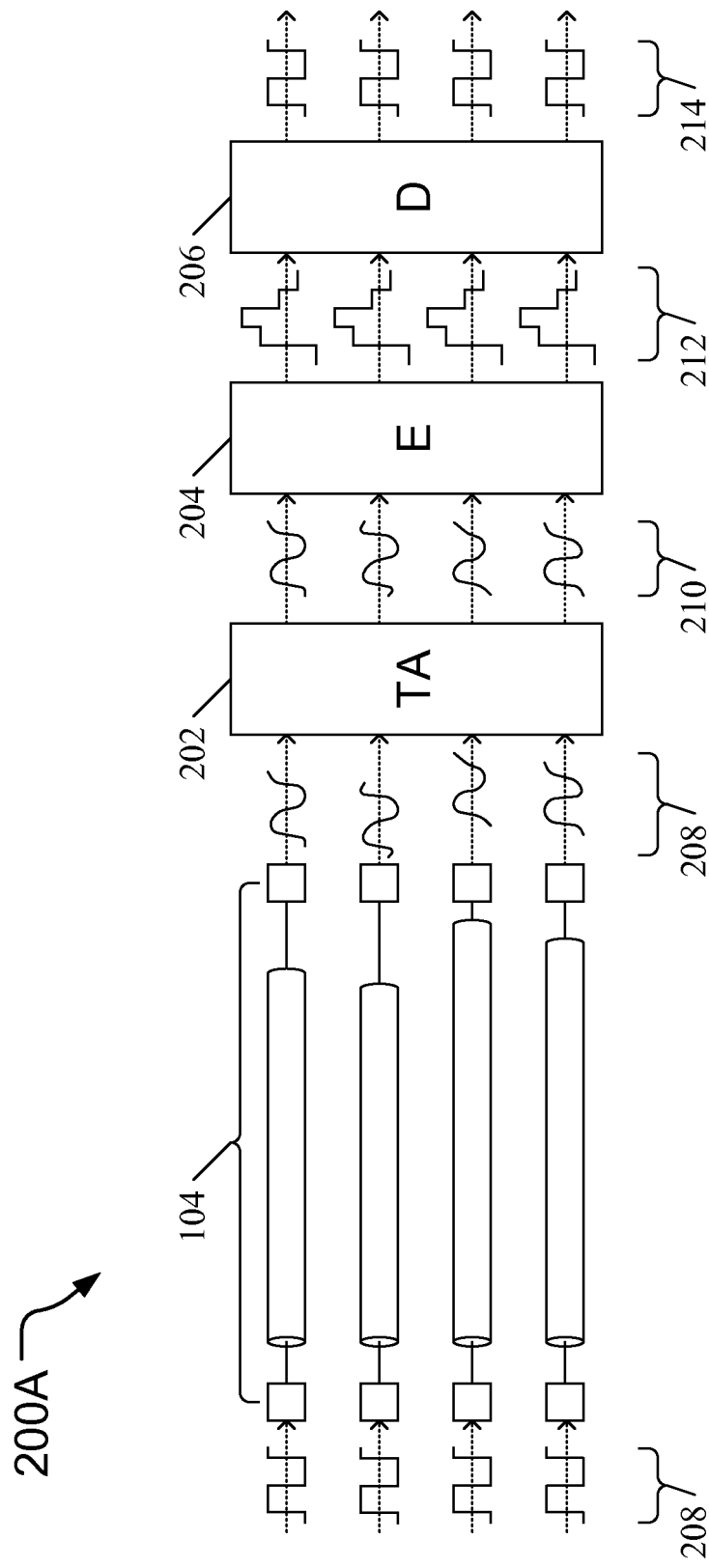
FIG. 2A is a block diagram illustrating an exemplary system for receiver-side asymmetric multimode interconnect according to an embodiment of the subject matter described herein.

FIG. 2A is a block diagram illustrating an exemplary system 200A for receiver-side asymmetric multimode interconnect according to an embodiment of the subject matter described herein. Multimode interconnect is based on frequency-domain multimode transmission line (MTL) theory. In contrast to conventional multimode interconnect, however, in receiver-side asymmetric multimode interconnect the transmitter transmits data that has not been encoded, herein referred to as "raw" data, and all crosstalk cancelling processes are done by the receiver. Thus, system 200A includes a multipath interconnect 104, a timing adjustment block (TA) 202, a T encoder (E) 204, and a $T^{-1}$ decoder (D) 202. Multipath interconnect 104 may be traces on a printed circuit board, coaxial cables, or other types of wired interconnects. In one embodiment, multipath interconnect 104 may be a set of microstriplines.

In the embodiment illustrated in FIG. 2A, raw transmit binary data 208 is sent across multipath interconnect 104 and emerges at the far end as receive binary data 208, which includes cross-talk and timing differences as a result from its transmission through multipath interconnect 104. Receive binary data 208 is processed by timing adjustment block 202 to produce delay-adjusted receive binary data 210, which is input into T encoder 204. T encoder 204 produces encoded data 212, which is input into $T^{-1}$ decoder 206 to produce receive binary data 214. Receive binary data 214 is substantially equivalent to binary data 208—e.g., data 208 and data 214 may have different absolute voltages or voltage swings, data 214 may include noise from sources other than crosstalk, and so on—but the information content of data 208 and 214 is the same. Thus, receive binary data 214 is a reconstruction of raw transmit binary data 208.

In one embodiment, if decoder 206 effectively decomposes the channel matrix LC, the eigenvalues of the LC matrix represent different propagation velocities. These propagation delay differences are compensated by timing adjustment block 202. The delay-adjusted signals 210 are the fundamental mode signals of the transmitted binary signals 208 without the channel crosstalk. In this manner the original binary information can be reconstructed by operation of decoder 206.

Figure 2B:
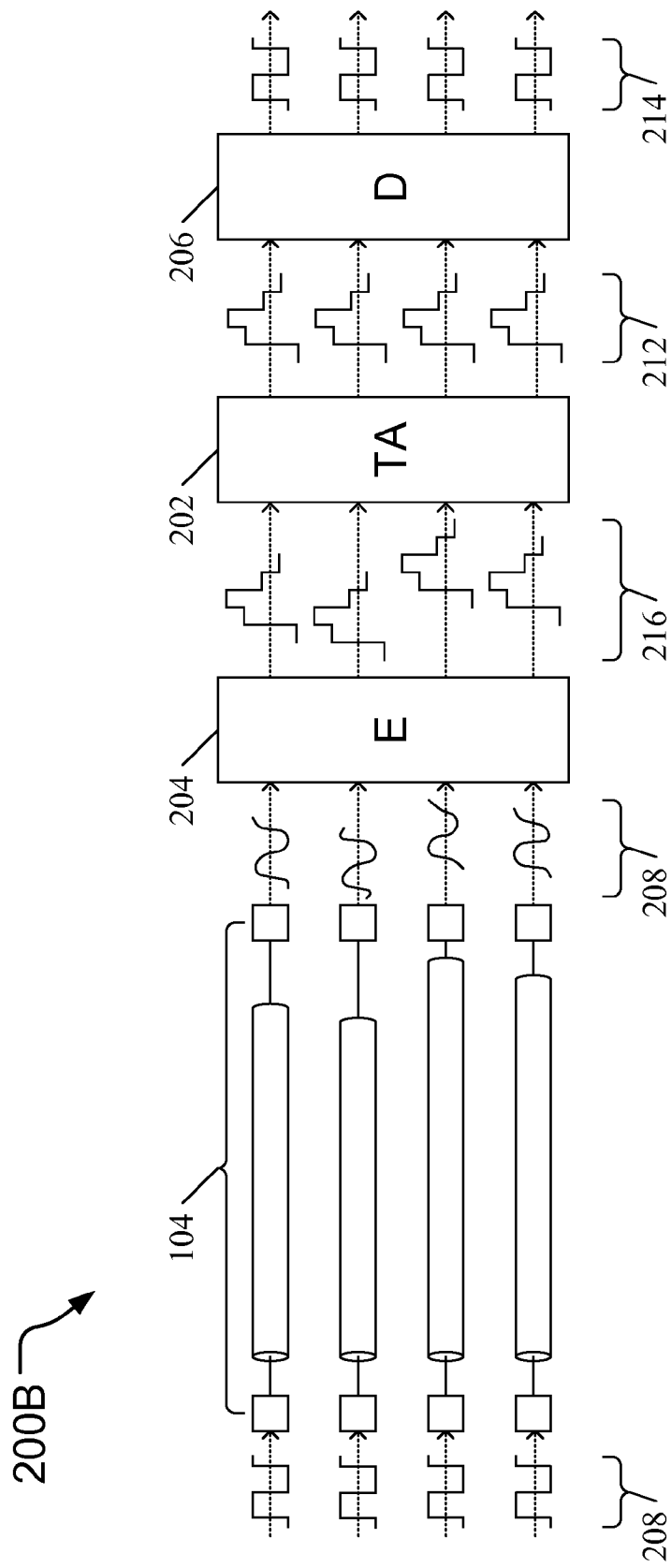
FIG. 2B is a block diagram illustrating an exemplary system for receiver-side asymmetric multimode interconnect according to another embodiment of the subject matter described herein.

FIG. 2B is a block diagram illustrating an exemplary system 200B for asymmetric multimode interconnect according to another embodiment of the subject matter described herein. In the embodiment illustrated in FIG. 2B, the positions of timing adjustment block 202 and T encoder 204 have been swapped. As a result, receive binary data 208 is encoded into non-delay-adjusted encoded data 216, which is input into timing adjustment block TA 202 to produce delay-adjusted encoded data 212. Encoded data 212 is decoded by $T^{-1}$ decoder 206 to produce receive binary data 214. Here also, receive binary data 214 is therefore a reconstruction of raw transmit binary data 208. Thus, the embodiment illustrated in FIG. 2B produces the same result as the embodiment illustrated in 2A.

The operation of this embodiment of asymmetric multimode interconnect has been both confirmed in simulation and proven in actual practice. To explain why, it is useful to review multi-conductor transmission line (MTL) theory. In the frequency-domain, MTL equations are given in matrix form:

$$\frac{d}{dz}Vz = -ZI(z)$$

and $$\frac{d}{dz}Iz = -YV(z)$$

where the n×1 column vectors V z and I z and the n×n per-unit-length impedance and admittance matrices Z and Y are given by $Z=R+j\omega L$ and $Y=G j\omega C$. These equations can be placed in the form of second-order ordinary differential equations $$\frac{d^2}{dz^2}Vz = ZYV(z)$$

and

-continued $$\frac{d^2}{dz^2}Iz = YZI(z)$$

If we can get V $z=T_v V_m(z)$ and I $z=T_I I_m(z)$ to diagonalize ZY and YZ via similarity transformation as $$T_V^{-1}ZYT_V = \gamma^2$$

$$T_I^{-1}YZT_I = \gamma^2$$

then we can get $$\frac{d^2}{dz^2}V_m z = T_V^{-1}ZYT_V V_m z = \gamma^2 V_m z$$

$$\frac{d^2}{dz^2}I_m z = T_I^{-1}YZT_I I_m z = \gamma^2 I_m z$$

In the conventional implementation of multimode interconnect, the T and $T^{-1}$ matrices are used in CODECs at opposite ends of the transmission line bundle so that the signals on the transmission lines are sent as combinations of the fundamental modes, with the result that zero crosstalk occurs. However, it can be recognized that the mathematical integrity of the equations above can be obtained without requiring a matrix transformation or CODEC at the start of the transmission line bundle. This theory is developed below.

The solution for these telegraphers equations, the actual line voltages and currents are given as $$V_m z = e^{-\gamma z}V_m^+ + e^{\gamma z}V_m^-$$

$$I_m z = e^{-\gamma z}I_m^+ - e^{\gamma z}I_m^-$$

and $$Vz = T_V(e^{-\gamma z}V_m^+ + e^{\gamma z}V_m^-)$$

$$Iz = T_I(e^{-\gamma z}I_m^+ - e^{\gamma z}I_m^-)$$

Assuming there are no back-traveling waves due to proper terminations, the voltages and currents at the end of transmission line (l) can be described as $$V_m l = e^{-\gamma l}V_m^+$$

$$I_m l = e^{-\gamma l}I_m^+$$

Referring to FIG. 2B, these are the voltages and currents at the end of multipath interconnect 104 and the input of encoder 204. At the output of encoder 204, the voltages and currents are $$Vl = T_V(e^{-\gamma l}V_m^+)$$

$$Il = T_I(e^{-\gamma l}I_m^+)$$

Because γ can be a diagonal matrix when Z jωL and Y jωC are also diagonal matrices. If there is a functional block placed next working as $$\frac{1}{e^{-\gamma l}}$$

(e.g., timing adjustment block 202) then we can get at the output of this block the following signals $$Vl = T_V e^{-\gamma l} \begin{pmatrix} \frac{1}{e^{-\gamma_1 k_1}} & 0 & 0 & \cdots \\ 0 & \frac{1}{e^{-\gamma_2 k_2}} & 0 & \cdots \\ 0 & 0 & \frac{1}{e^{-\gamma_3 k_3}} & \cdots \\ \cdots & \cdots & \cdots & \cdots \end{pmatrix}$$

$$= T_V e^{-\gamma l} e^{-\gamma_n k_n} T_V^{-1} V(0)$$

$$V_m^+ = T_V e^{-\gamma l} \frac{1}{e^{-\gamma_n k_n}} V_m^+$$

$$Il = T_I e^{-\gamma l} \begin{pmatrix} \frac{1}{e^{-\gamma_1 k_1}} & 0 & 0 & \cdots \\ 0 & \frac{1}{e^{-\gamma_2 k_2}} & 0 & \cdots \\ 0 & 0 & \frac{1}{e^{-\gamma_3 k_3}} & \cdots \\ \cdots & \cdots & \cdots & \cdots \end{pmatrix}$$

$$= T_I e^{-\gamma l} e^{-\gamma_n k_n} T_I^{-1} I(0)$$

$$I_m^+ = T_I e^{-\gamma l} \frac{1}{e^{-\gamma_n k_n}} I_m^+$$

where $T_V e^{-\gamma l} e^{-\gamma_n k_n} T_V^{-1}$ and $T_I e^{-\gamma l} e^{-\gamma_n k_n} T_I^{-1}$ are diagonal matrices when $V\,0 = T_V(V_m^+)$ and $I\,0 = T_I(I_m^+)$.

Figure 1:
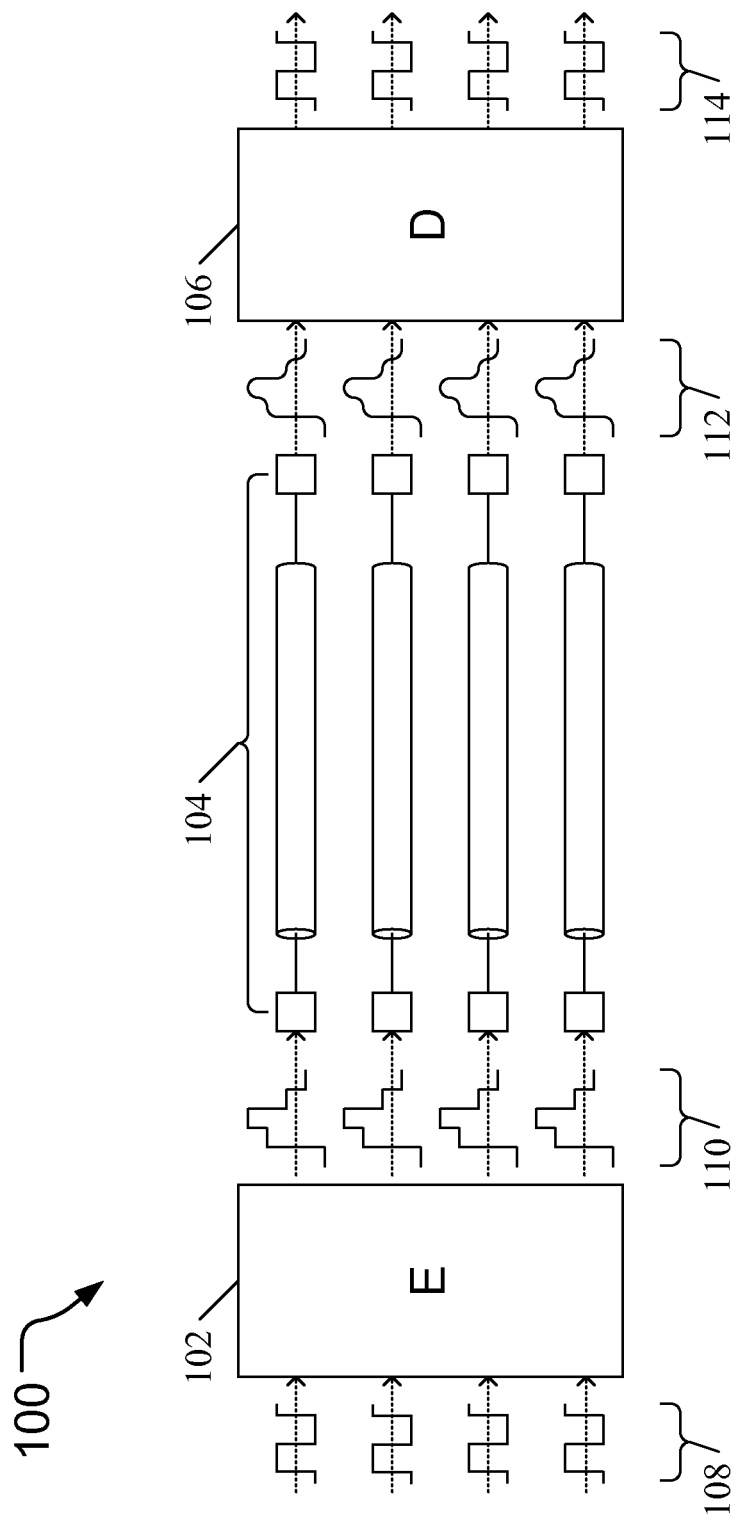
FIG. 1 is a block diagram illustrating a conventional multimode interconnect implementation.

These signals (e.g., delay-adjusted encoded data 212) are now replicas of signals 110 that originally appeared at the output of encoder 102 in the conventional multimode interconnect implementation illustrated in FIG. 1. Passing these signals through the decoders $T_V^{-1}$ or $T_I^{-1}$ recovers the original binary signal.

The functional block working as $$\frac{1}{e^{-\gamma_n k_n}},$$

is simply a phase or time delay block. Because it is diagonal, only one block is needed per line. If this block is implemented at the receiver, to compensate for the different delays on the line on each bundle, then the entire CODEC can be built at the receiver, by implementing $$T_V \frac{1}{e^{-\gamma_k}} T_V^{-1},$$

i.e. two transforms and a phase delay.

Asymmetric multimode interconnect theory can be expressed by S-parameter operations. Input voltages and output voltages have the relationship, $V_{OUT} = SV_{IN}$ with proper terminations where S is a reduced S-parameter matrix and where $V_{IN}$ and $V_{OUT}$ are input and output voltage matrices. If there is a T matrix which can make $T^{-1}ST$ diagonal, the operation, $T\gamma^{2-1}T^{-1}S$ can be expressed as $$T\gamma^{2-1}T^{-1}S = TT^{-1}ST^{-1}T^{-1}S$$

By the definition of matrix multiplication, $$TT^{-1}ST^{-1}T^{-1}S = TT^{-1}S^{-1}TT^{-1}S$$

Equivalently we can get $$TT^{-1}S^{-1}TT^{-1}S = TT^{-1}S^{-1}TT^{-1}S = I_{unity}$$

Where $I_{unity}$ is an n×n unity matrix. Based on the matrix relationship, the following is true:

$$T\gamma^{2-1}T^{-1}Vl = T\gamma^{2-1}T^{-1}SV0$$
$$= V0$$

This operation is the fundamental base of binary multimode interconnect. Because the above operation shows that from the received voltage set, V 1, the initially transmitted set, V 0 can be restored by the proposed operation, $T\gamma^{2-1}T^{-1}$.

Figure 3A:
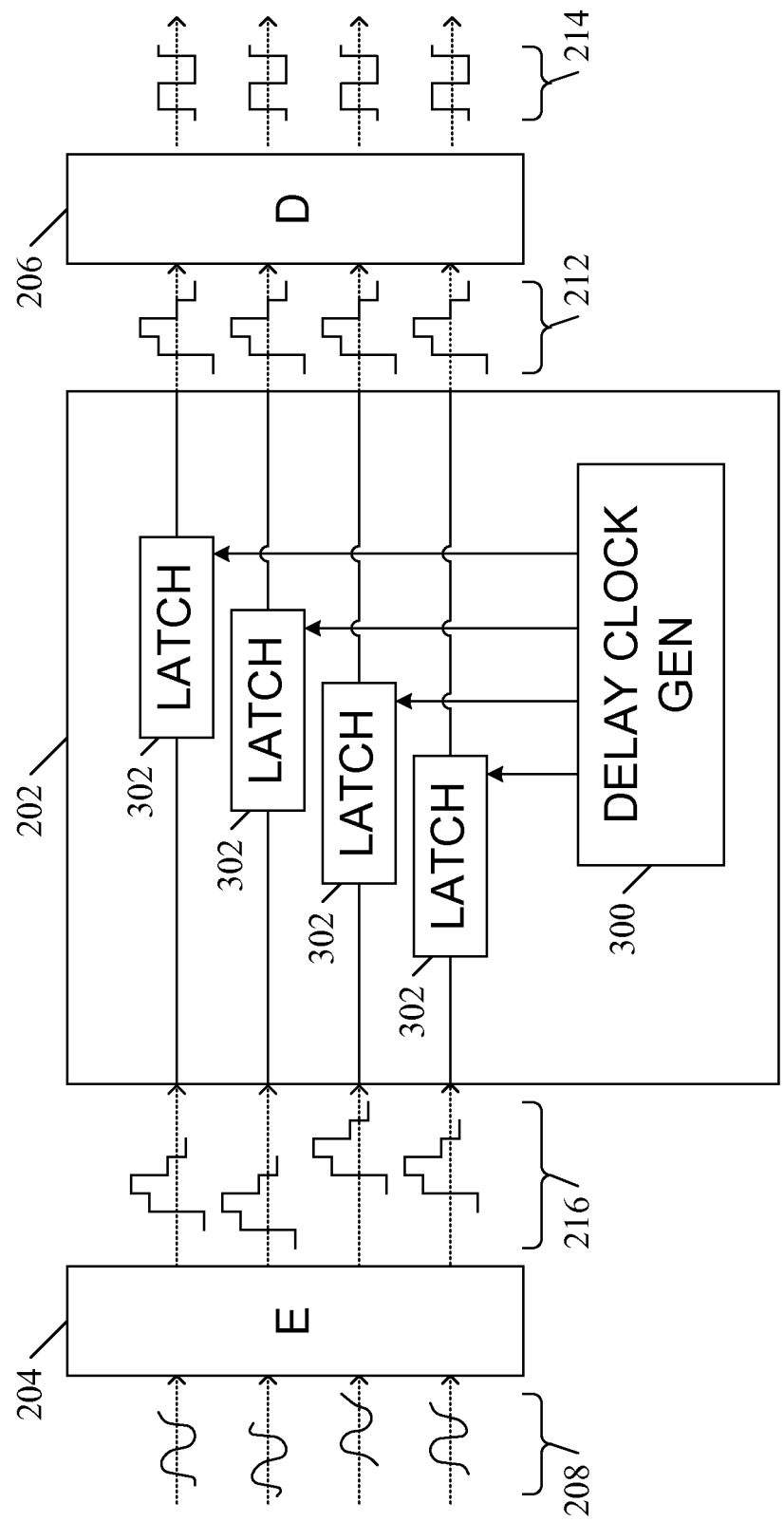
FIG. 3A is a block diagram illustrating in detail a portion of timing adjustment block according to an embodiment of the subject matter described herein.
Figure 3B:
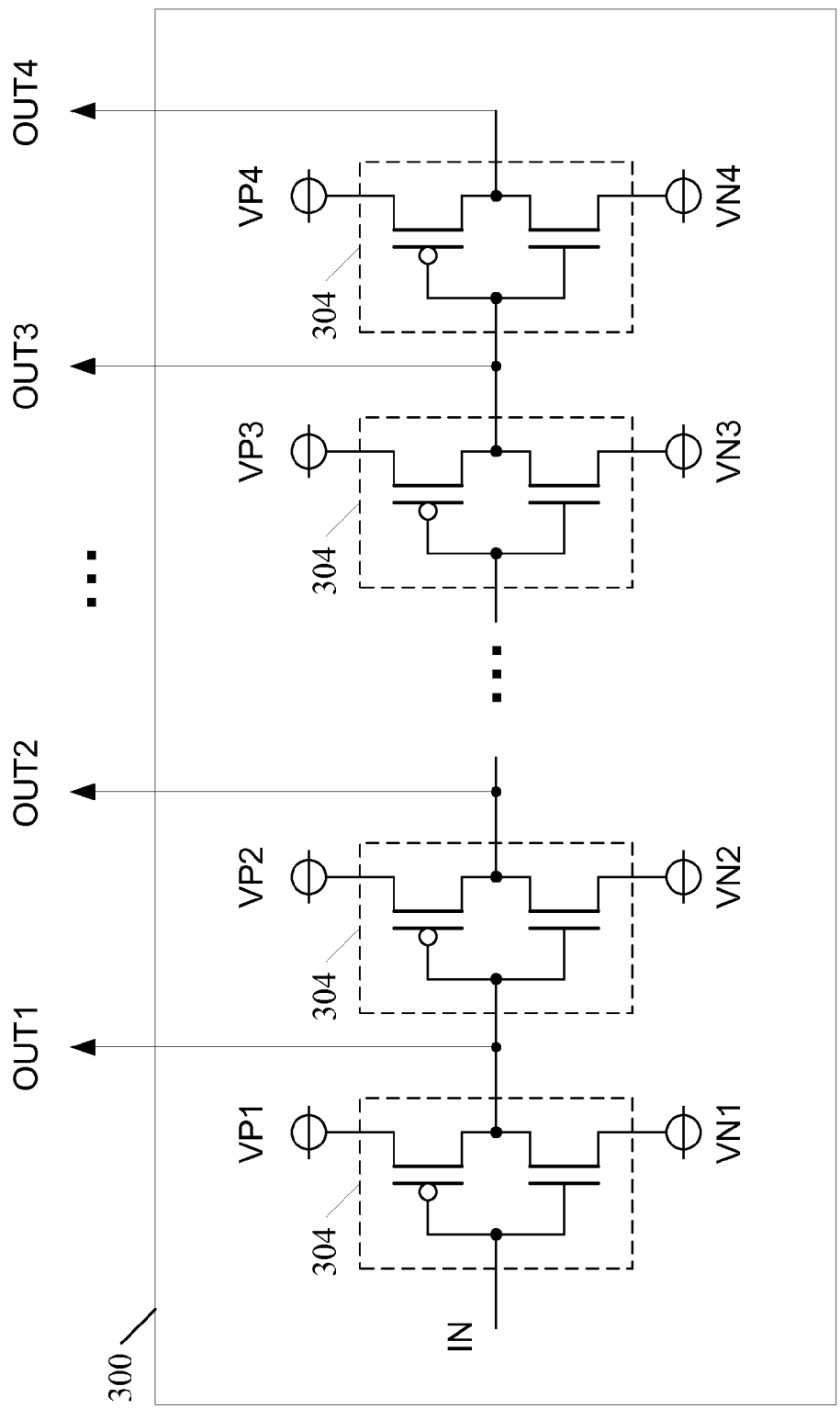
FIG. 3B is a block diagram illustrating an exemplary delay clock generator according to an embodiment of the subject matter described herein.
Figure 3C:
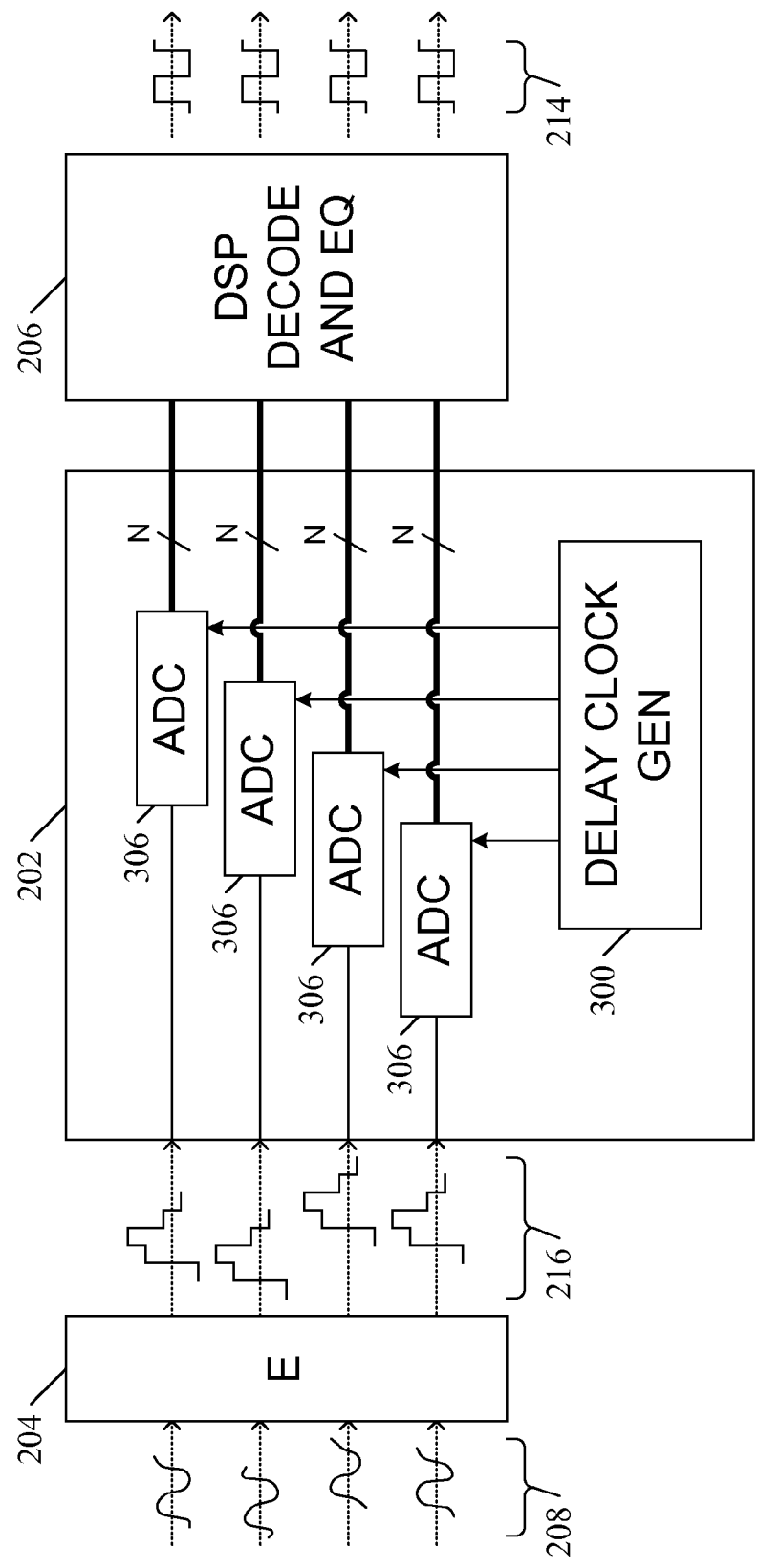
FIG. 3C is a block diagram illustrating in detail a portion of timing adjustment block and decoder according to an embodiment of the subject matter described herein.

FIGS. 3A and 3B are block diagrams illustrating portions of exemplary systems for receiver-side asymmetric multimode interconnect according to other embodiments of the subject matter described herein. FIGS. 3A through 3C show in more detail possible implementations of the timing adjustment block 202 and decoder 206 shown in FIG. 2B.

FIG. 3A is a block diagram illustrating in detail a portion of timing adjustment block 202 according to an embodiment of the subject matter described herein. In the embodiment illustrated in FIG. 3A, timing adjustment block 202 includes a set of latches 302 to capture or sample-and-hold data to be presented to decoder 206. A delay clock generator 300 provides to each latch 302 a sampling clock signal input having timing that is adjusted to reflect a specified, measured, or determined channel delay of the particular transmission line or data channel that is supplying data to the particular latch. In this manner, timing adjustment block 202 outputs delay-adjusted encoded data 212, which decoder 206 decodes to produce receive binary data 214.

FIG. 3B is a block diagram illustrating an exemplary delay clock generator 300 according to an embodiment of the subject matter described herein. In the embodiment illustrated in FIG. 3B, delay clock generator 300 includes a delay chain of inverters 304 which takes an input clock or signal IN and produces a set of output signals OUT1, OUT2, OUT3, and OUT4. Although the embodiment illustrated in FIG. 3B includes four inverters 304 and produces four output signals, other embodiments are contemplated, such as embodiments having a different number of inverters and embodiments in which the number of outputs do not match the number of inverters used.

In one embodiment, delay clock generator 300 includes a multiphase clock. For example, the input signal IN may be a clock signal and the outputs OUT1 through OUT4 are the input clock delayed by increasing values to produce a multiphase clock output. In one embodiment, the outputs of inverters 304 may be supplied to select logic that chooses one of the inverter outputs each of the signals output by delay clock generator 300.

In one embodiment, delay clock generator 300 includes a voltage-controlled delay circuit. In the embodiment illustrated in FIG. 3B, for example, each inverter 304 has a positive supply voltage VPx and a negative supply voltage VNx. The inverter to which IN is connected has a positive supply voltage VP1 and a negative supply voltage VN1, the next inverter has a positive supply voltage VP2 and a negative supply voltage VN2, and so on. In one embodiment, the delay through each inverter 304 may be controlled by adjusting one or both of the supply voltages.

In one embodiment, the positive and negative supply voltages are the same for each inverter, e.g., VP1=VP2=VP3=VP4 and VN1=VN2=VN3=VN4. For example, the delay through each inverter 304 may decrease as the value of VP increases. This allows the delay through the inverter chain to be scaled as a unit, e.g., the delay through each inverter 304 is the same as the delay through the other inverters, and a change to a supply will adjust the delays through all inverters proportionately.

In one embodiment, the delay through each inverter 304 may be controlled independently of the delay through the other inverters by adjusting one or both of the supply voltages of each inverter independently of each other, e.g., VP1≠VP2, VN1≠VN2, etc. By adjusting the supply voltages to each inverter 304 independently, the relative delays of the outputs OUT1 through OUT4 can be arbitrarily controlled.

FIG. 3C is a block diagram illustrating in detail a portion of timing adjustment block 202 and decoder 206 according to an embodiment of the subject matter described herein. In the embodiment illustrated in FIG. 3C, timing adjustment block 202 performs both delay adjustment and digitization of non-delay-adjusted encoded data 216 and provides the delay-adjusted, digitized data to decoder 206, which produces receive binary data 214. In the embodiment illustrated in FIG. 3C, delay clock generator 300 provides clock inputs to a set of analog to digital converters (ADC) 306. Each clock input produced by the delay clock generator 300 is independently adjusted to reflect a specified, measured, or determined channel delay of the particular transmission line or data channel that is supplying data to the particular ADC. In the embodiment illustrated in FIG. 3C, each ADC 306 produces N-bits of binary data, which are provided to decoder 206.

In one embodiment, decoder 206 is or includes a digital signal processor (DSP) that performs the $T^{-1}$ decoding algorithm. In one embodiment, decoder 206 and may also equalize the signals to compensate for the frequency response of the transmission lines. In the embodiment illustrated in FIG. 3C, for example, decoder 206 may be a DSP that receives the multiple sets of delay-adjusted and digitized signals from ADCs 306 and uses this data as input into a $T^{-1}$ decoding algorithm. One advantage to using a DSP is that the particular algorithm may be changed or updated. In one embodiment, the DSP may select from a number of available algorithms. Because all of the encoding and decoding occurs one just one side of the transmission line in asymmetric multimode interconnect, decoder 206 is free to adjust the algorithm as it sees fit without having to require the sender to adjust or accommodate the new algorithm. Moreover, the sender need not know anything about the particular method, algorithm, or implementation used by the receiving end. The asymmetric nature of the system allows enormous flexibility of design and implementation, because design or implementation changes may be made unilaterally.

One disadvantage to using ADCs and DSPs, however, is that they consume relatively large amounts of power. In some circumstances, the function of an ADC and DSP may be performed by multiple operational latches with different bias currents. Such an implementation uses less power than an ADC or DSP. An example of an operational latch is shown in FIG. 4.

Figure 4:
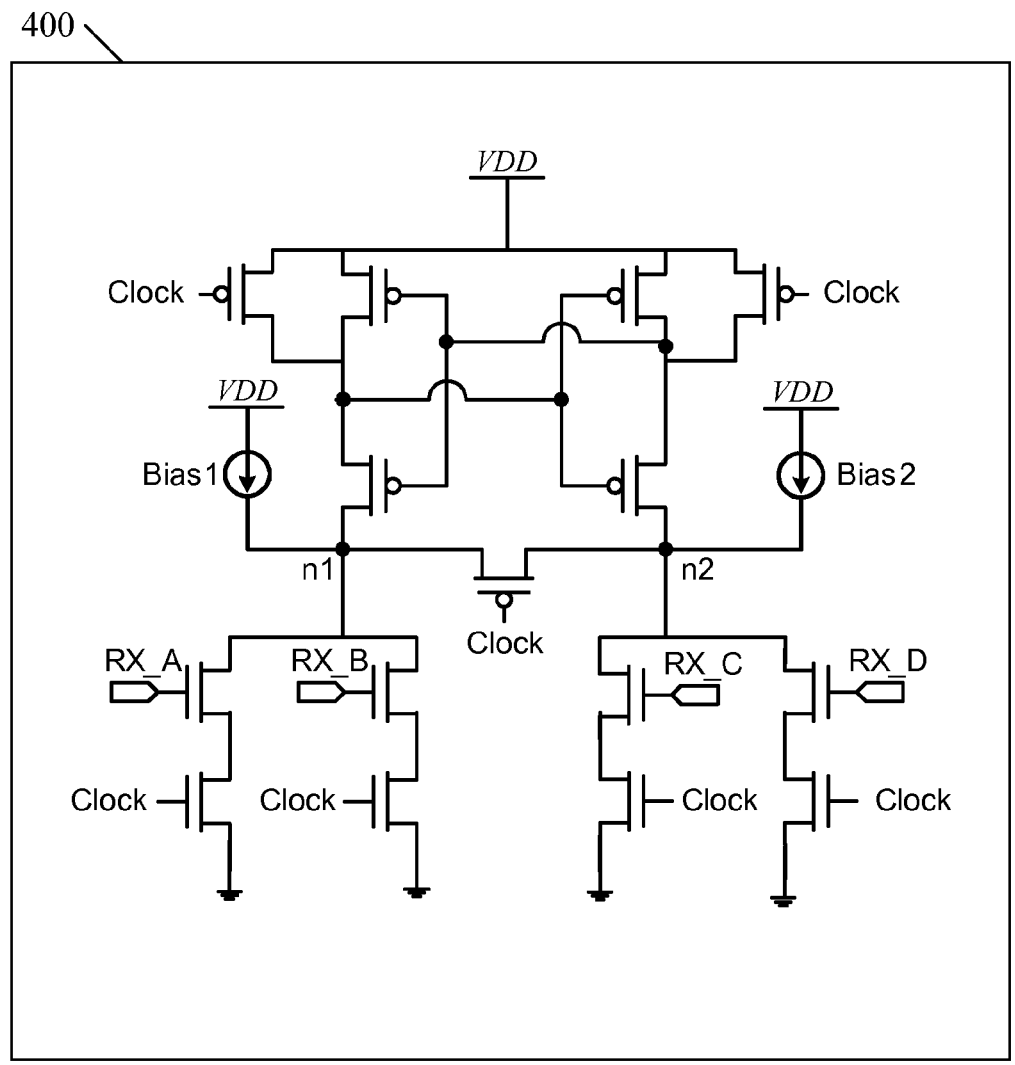
FIG. 4 is a schematic diagram of an exemplary operational latch according to an embodiment of the subject matter described herein.

FIG. 4 is a schematic diagram of an exemplary operational latch according to an embodiment of the subject matter described herein. In the embodiment illustrated in FIG. 4, latch 400 uses two bias current sources, Bias1 and Bias2. Four inputs, RX_A, RX_B, RX_C, and RX_D, receive the signals at the end of the transmission lines, and the coefficients of the decoder are controlled by the widths of the input NMOS transistors that the four inputs control. In one embodiment, a vernier circuit or other timing adjustment circuit may be used to adjust timing of each of the clock signals so that latch 400 can compensate using the data delays of each transmission line, e.g., the eigenvalues of the channel LC matrix. Output nodes n1 and n2 are digital signals which are the result of the decoding operation.

Figure 5:
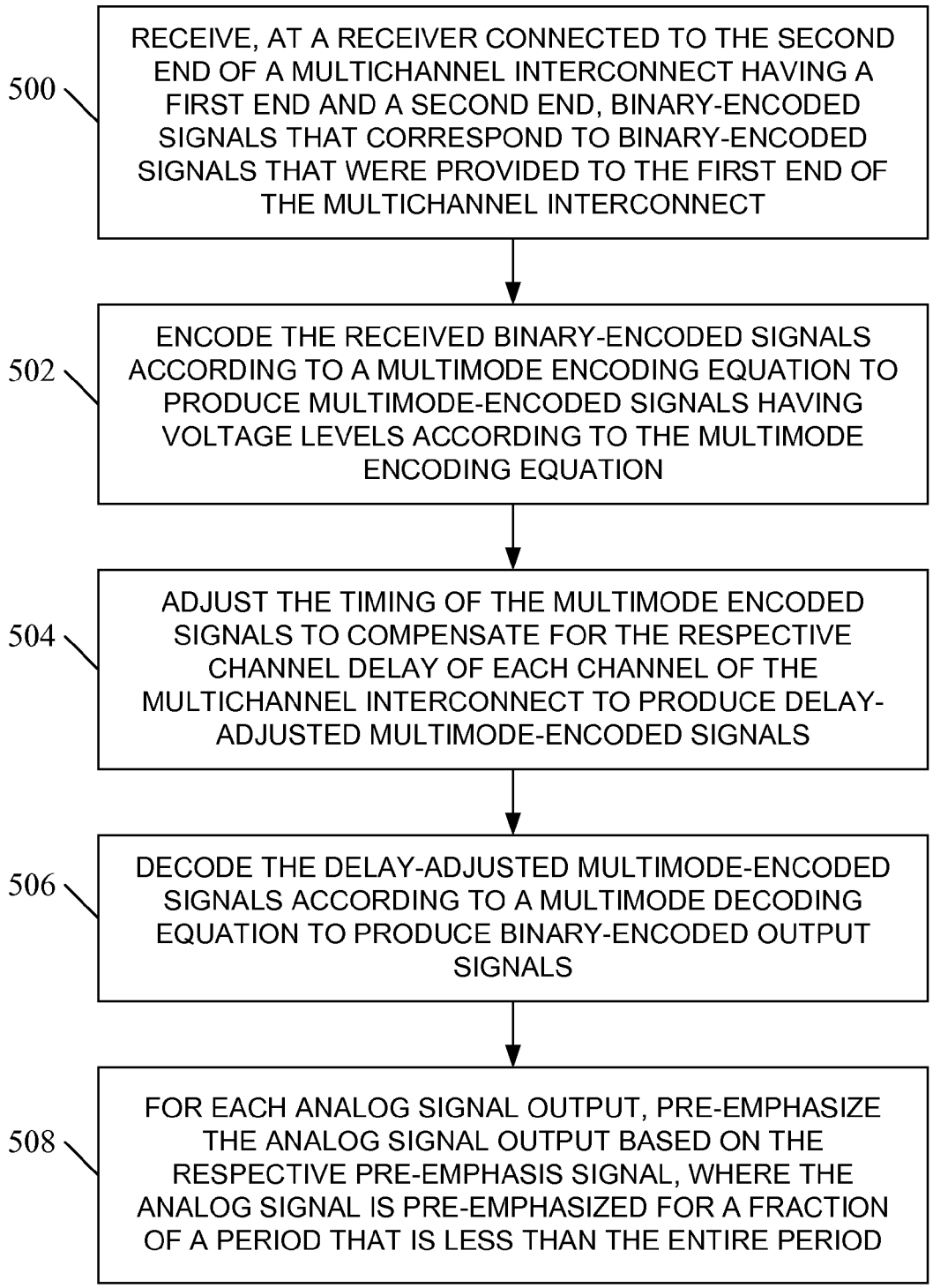
FIG. 5 is a flow chart illustrating an exemplary process for receiver-side asymmetric multimode interconnect according to an embodiment of the subject matter described herein.

FIG. 5 is a flow chart illustrating an exemplary process for receiver-side asymmetric multimode interconnect according to an embodiment of the subject matter described herein. At step 500, a receiver connected to the second end of a multi-channel interconnect having a first end and a second end receives binary-encoded signals that correspond to binary-encoded input signals that were provided to the first end of the multichannel interconnect. At step 502, the received binary-encoded signals are encoded according to a multimode encoding equation to produce multimode-encoded signals having voltage levels according to the multimode encoding equation. At step 504, the timing of the multimode-encoded signals are adjusted to compensate for channel delays of each channel of the multichannel interconnect and to produce delay-adjusted multimode-encoded signals. At step 506, the delay-adjusted multimode-encoded signals are decoded according to a multimode decoding equation to produce binary-encoded output signals.

In an alternative embodiment, the order of the encoding and adjusting steps may be reversed. For example, the binary-encoded signals received in step 500 above may be subjected to a timing adjustment such as described in step 504, above, before being encoded as described in step 502, above. This sequence would also produce a set of delay-adjusted multimode-encoded signals that can be decoded as described in step 506, above, to produce binary-encoded output signals.

In the embodiments of receiver-side asymmetric multimode interconnect described above, the encoding and decoding steps that are on opposite sides of the transmission line in conventional multimode interconnect systems have been moved to the receiver side. In the embodiments of asymmetric multimode interconnect described below, these operations are move to the transmitter side. These embodiments are referred to as transmitter-side asymmetric multimode interconnect.

Figure 6:
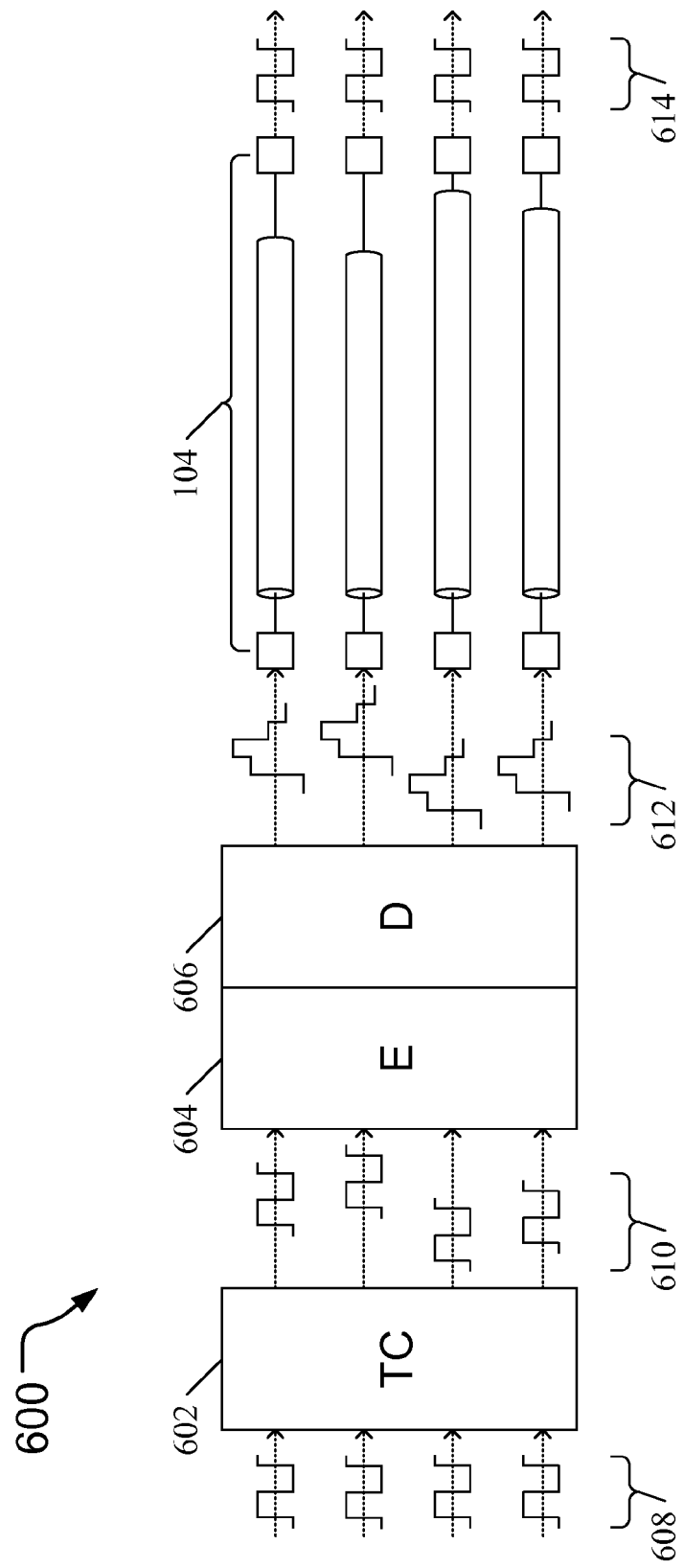
FIG. 6 is a block diagram illustrating an exemplary system for transmitter-side asymmetric multimode interconnect according to another embodiment of the subject matter described herein.

FIG. 6 is a block diagram illustrating an exemplary system for transmitter-side asymmetric multimode interconnect according to another embodiment of the subject matter described herein. In the embodiment illustrated in FIG. 6, system 600 includes a timing compensation block 602, an encoder block 604, and a decoder block 606, which drives a multichannel interconnect 104. In contrast to conventional system 100 illustrated in FIG. 1, in which encoder 102 and decoder 106 are on opposites side of multichannel interconnect 104 from each other, in transmitter-side asymmetric multimode interconnect system 600 both encoder 604 and decoder 606 are on the same side of multichannel interconnect 104: i.e., the transmitter side.

In one embodiment, timing compensation block 602 receives as input binary transmit data 608 and produces delay-compensated transmit data 610. Each signal of delay-compensated transmit data 610 is delayed relative to the other signals so as to cancel the transmission delays that will be incurred through multichannel interconnect 104. Delay-compensated transmit data 610 is then processed by encoder 604 and decoder 606 to produce pre-compensated transmit data 612, which is transmitted over multichannel interconnect 104. The signals that emerge from the far end of multichannel interconnect 104 are binary receive data 614, which is a reconstruction of binary transmit data 608.

In one embodiment, encoder 604 implements a $T^{-1}$ matrix while decoder 606 implements a $T^{-1}$ matrix, where T and $T^{-1}$ are constant and invertible matrices. Careful selection of T and $T^{-1}$ will result in crosstalk cancellation. If $T_V^{-1}ZYT_V$ for example is a diagonal matrix, then there are no cross terms and thus no crosstalk.

Figure 7:
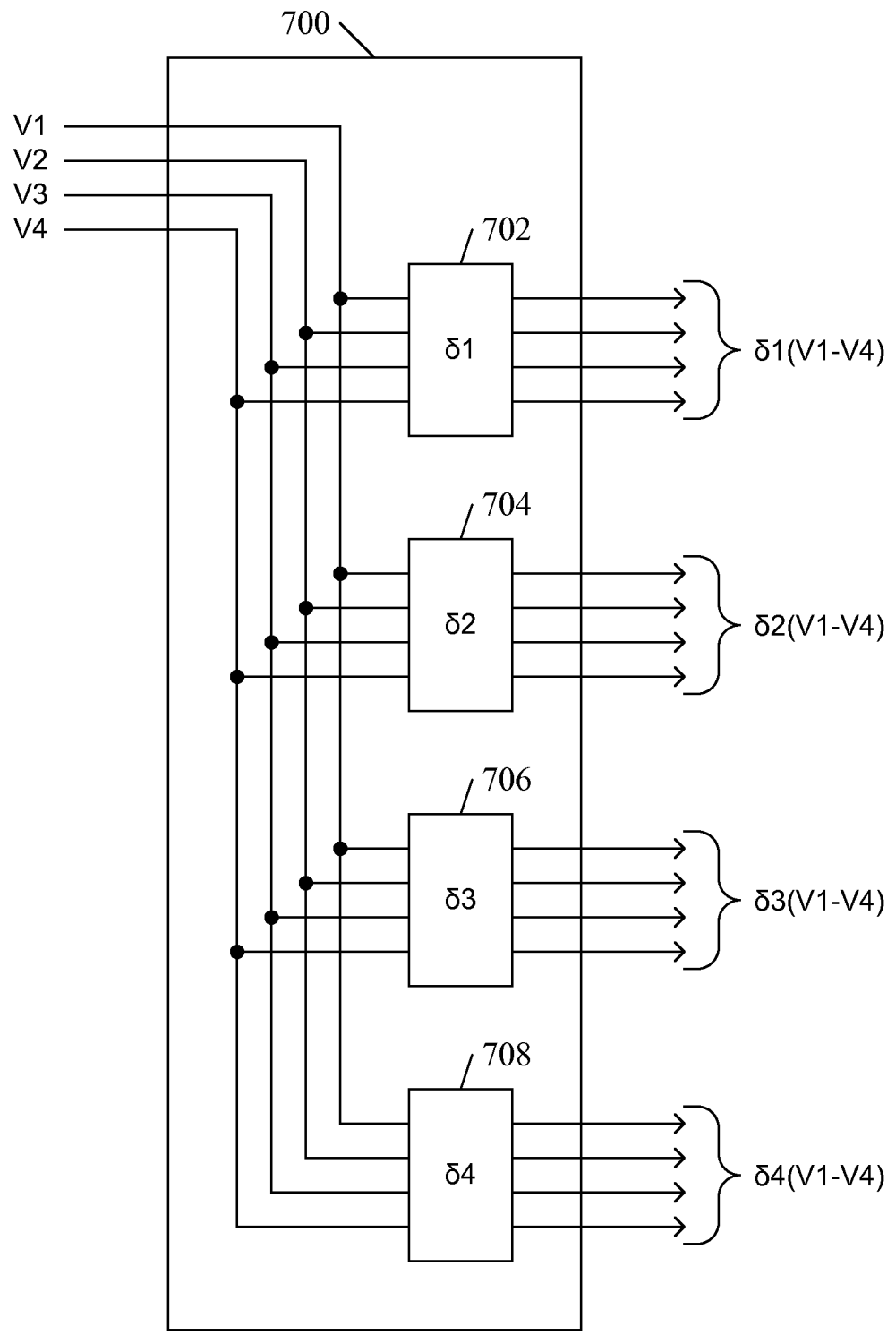
FIG. 7 is a block diagram illustrating in more detail a portion of an exemplary system for transmitter-side asymmetric multimode interconnect according to an embodiment of the subject matter described herein.

FIG. 7 is a block diagram illustrating in more detail a portion of an exemplary system for asymmetric multimode interconnect according to an embodiment of the subject matter described herein. In FIG. 7, timing compensation block 700 accepts as input binary transmit data 608, shown as inputs V1 through V4. Timing delay blocks 702, 704, 706, and 708 accept V1-V4 as input and impose a delay, shown in FIG. 7 as δ1 through δ4, respectively, to produce delayed versions of V1-V4, indicated as δ1(V1-V4) through δ4(V1-V4), respectively. The delays δ1-δ4 compensate for the different propagation time delays of the four channels of multichannel interconnect 104. Thus, in one embodiment, timing compensation block 700 receives four inputs and produces sixteen outputs. In an alternative embodiment, delay blocks 702, 704, 706, and 708 could be connected serially rather than in parallel, such that the output of delay block 702, i.e., δ1(V1-V4), is the input into delay block 704, the output of delay block 704, i.e., δ2(V1-V4), is the input into delay block 706, and so on. In one embodiment, a controllable timing delay may be provided by a chain of inverters in which the voltage of some of the inverters is adjusted to give a precise delay. In another embodiment, a multiphase clock may be used to provide delay. For example, one or more edges of one or more phases of the multiphase clock may be selected as inputs to a clocked latch, where selection of the particular edge or edges determines the delay of that latch relative to other latches, which may use different edges or phases.

In one embodiment, the sixteen bits output by timing compensation block 700 will be the inputs of each of four multi-level drivers, one for driver for each channel of multichannel interconnect 104. In one embodiment, each driver is equipped with 16 sub-drivers, the weightings of which are matched to the coefficients of T and $T^{-1}$ for a given channel. An example multilevel driver is shown in FIG. 8.

Figure 8:
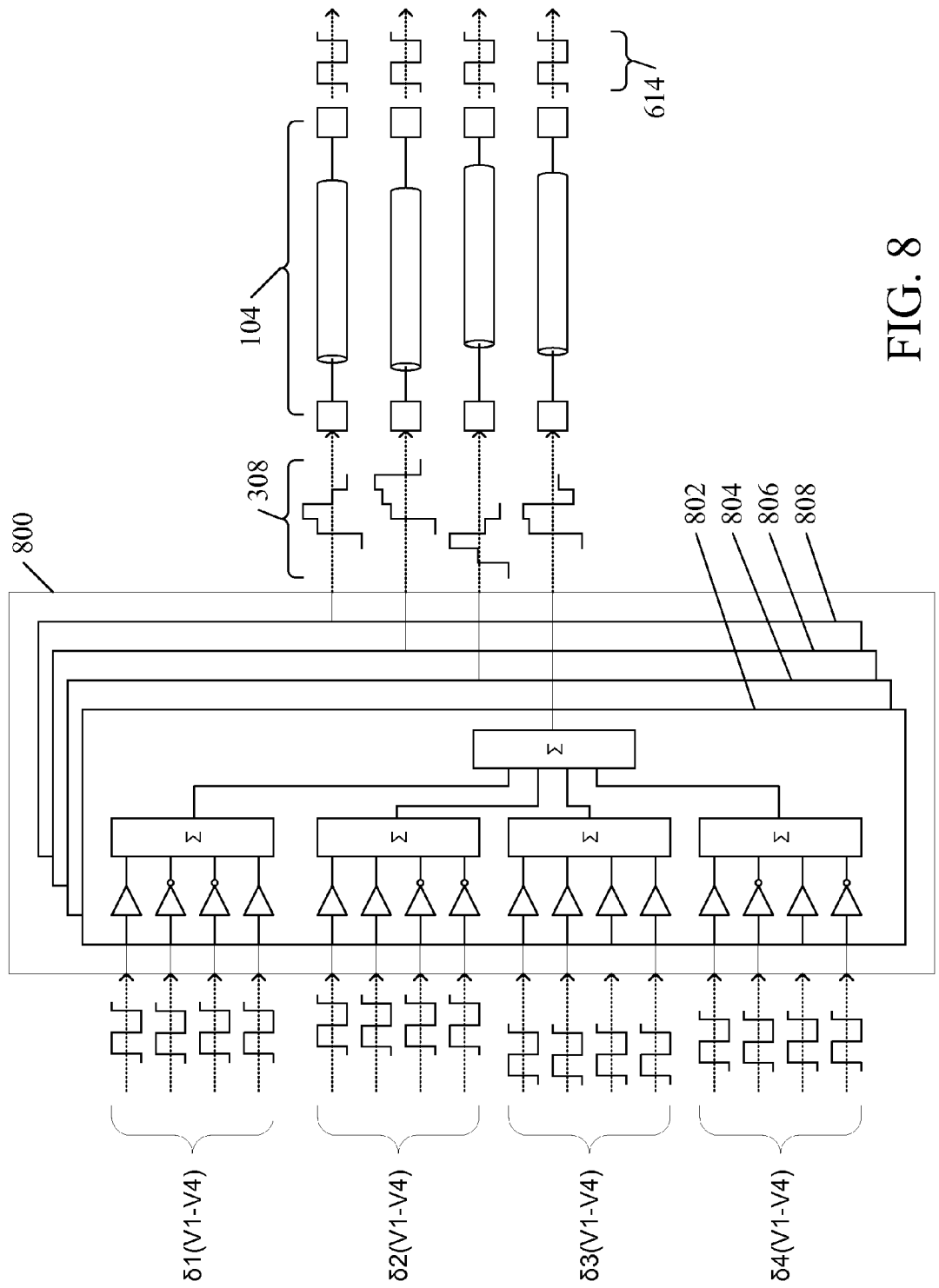
FIG. 8 is a block diagram illustrating in more detail another portion of an exemplary system for transmitter-side asymmetric multimode interconnect according to an embodiment of the subject matter described herein.

FIG. 8 is a block diagram illustrating in more detail another portion of an exemplary system for transmitter-side asymmetric multimode interconnect according to an embodiment of the subject matter described herein. Signal driver block 800 performs the functions of encoder block 604 and decoder block 606 from FIG. 6. In the embodiment illustrated in FIG. 8, signal driver block 800 includes four separate line drivers 802, 804, 806, and 808. Each line driver receives the sixteen inputs δ1(V1-V4) through δ4(V1-V4) that were produced by timing compensation block 700 and combine them according to an encoding algorithm. Table 1, below, illustrates an example encoding algorithm:

TABLE 1

Example Encoding Algorithm

| Driver | Output |
|---|---|
| 802 | δ1(+V1 −V2 −V3 +V4) + δ2(+V1 +V2 −V3 −V4) + δ3(+V1 +V2 +V3 +V4) + δ4(+V1 −V2 +V3 −V4) |
| 804 | δ1(−V1 +V2 +V3 −V4) + δ2(+V1 +V2 −V3 −V4) + δ3(+V1 +V2 +V3 +V4) + δ4(−V1 +V2 −V3 +V4) |
| 806 | δ1(−V1 +V2 +V3 −V4) + δ2(−V1 −V2 +V3 +V4) + δ3(+V1 +V2 +V3 +V4) + δ4(+V1 −V2 +V3 −V4) |
| 808 | δ1(+V1 −V2 −V3 +V4) + δ2(−V1 −V2 +V3 +V4) + δ3(+V1 +V2 +V3 +V4) + δ4(−V1 +V2 −V3 +V4) |

In one embodiment, the contributions of each voltage V1 through V4 into the summing operation have equal magnitude. In another embodiment, each voltage input into the summing operations may be weighted, e.g., multiplied by a coefficient. In one embodiment, a transmitter-side asymmetric multimode interconnect system may include one or more ADCs to convert analog signals into the digital domain, where they may be processed by a central processing unit, DSP, controller, or other logic to perform the calculations of the encoding algorithm.

In one embodiment, rather than using a relatively power-hungry ADC, CPU, or DSP, the encoding algorithm may be implemented by a series of operational latches. In one embodiment, for example, each driver may contain five operational latches. Using driver 802 and the table above, a first latch closes at time delay δ1 and performs the operation (+V1 −V2 −V3 +V4); a second latch closes at time delay δ2 and performs the operation (+V1 +V2 −V3 −V4); a third latch closes at time delay δ3 and performs the operation (+V1 +V2 +V3 +V4); and a fourth latch closes at time delay δ4 and performs the operation (+V1 −V2 +V3 −V4). A fifth latch sums the output of the previous four latches to produce the binary-encoded output for that channel.

In one embodiment, the inputs of each operational latch may be weighted to correspond to coefficients of an encoding algorithm. The weights for one latch's inputs may be different from the weights of another latch's inputs. Likewise, the set of weights for the latches of one driver may be different from the set of weights for the latches of another driver. Because transistor current scales linearly according to the transistor width, in one embodiment the weightings of each input's contribution can be controlled by the width of the transistor. In one embodiment, the relative widths of the transistors match the coefficients of T and $T^{-1}$ for a given channel.

There are several advantages to transmitter-side asymmetric multimode interconnect. Like the receiver-side asymmetric multimode interconnect illustrated in FIGS. 2A and 2B, the transmitter-side asymmetric interconnect illustrated in FIG. 6 enjoys the fundamental crosstalk cancellation that multimode interconnect affords but includes the additional advantage that, since the processing is performed on only one end of the multichannel interconnect 104, the circuitry at the other end can be very simple. For example, the elimination of the need for a decoder at the receive end of multichannel interconnect 104 in FIG. 6 means that a receiver can use conventional equalization circuits such as the common finite impulse response (FIR) equalization technique. The FIR technique is difficult to apply to the receive end of conventional symmetric multimode interconnect systems, but can be easily and safely implemented to equalize binary receive data 614 in FIGS. 6 and 8, for example. Also like the receiver-side asymmetric multimode interconnect illustrated in FIGS. 2A and 2B, the encoding algorithms, the weighting coefficients, and other implementation details of the transmitter-side asymmetric interconnect illustrated in FIG. 6 may be modified on the transmit side without requiring a corresponding adjustment to be made to the receive side. In one embodiment, signal driver block 800 may be able to select an algorithm or weighting from multiple available algorithms or weightings.

Figure 9:
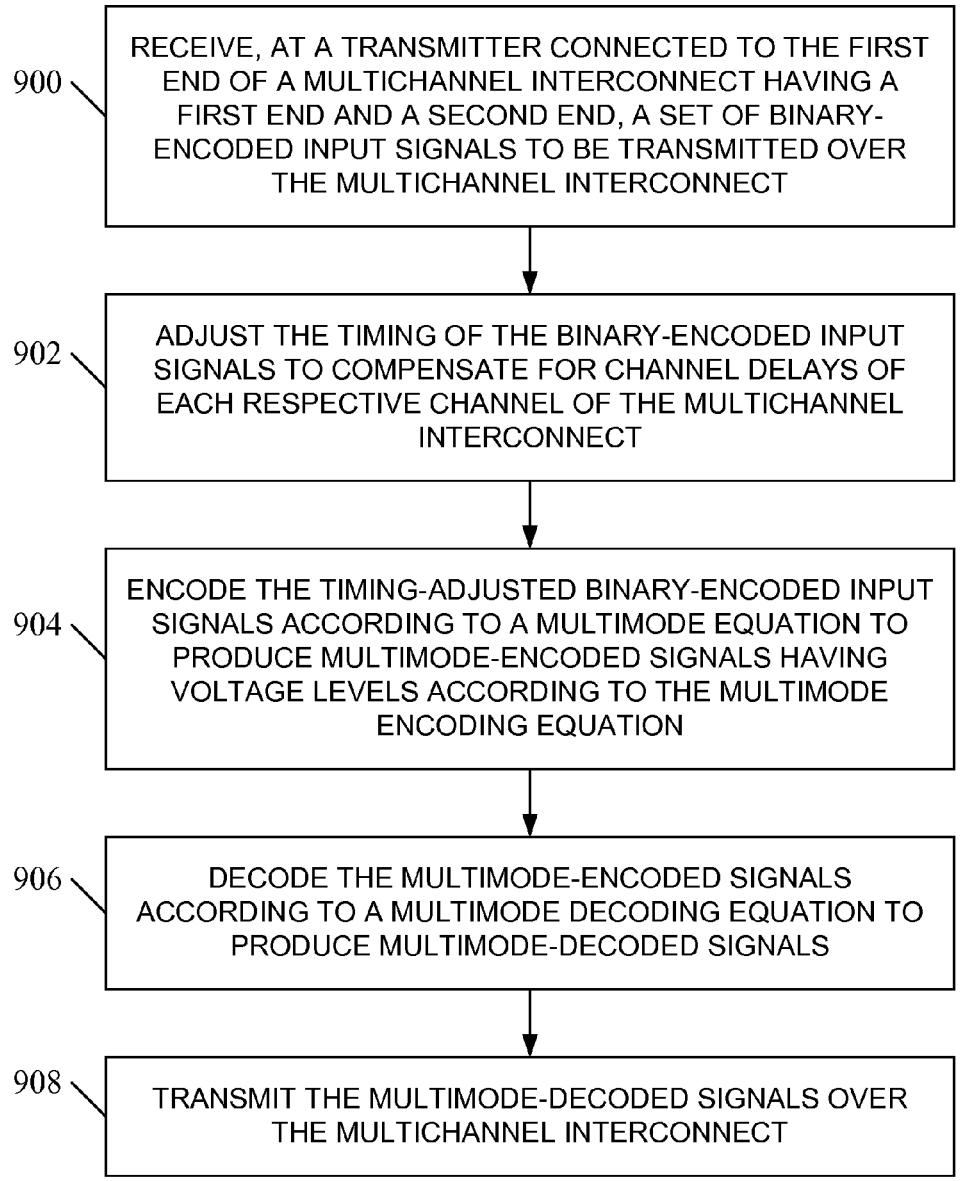
FIG. 9 is a flow chart illustrating an exemplary process for transmitter-side asymmetric multimode interconnect according to an embodiment of the subject matter described herein.

FIG. 9 is a flow chart illustrating an exemplary process for transmitter-side asymmetric multimode interconnect according to an embodiment of the subject matter described herein. At step 900, a transmitter connected to the first end of a multichannel interconnect having a first end and a second end receives a set of binary-encoded input signals representing data to be transmitted over the multichannel interconnect. At step 902, the timing of the set of binary-encoded input signals is adjusted to pre-compensate for channel delays of each channel of the multichannel interconnect. This produces a set of timing-adjusted binary encoded-input signals. At step 904, the timing-adjusted binary encoded input signals are encoded according to a multimode encoding equation to produce multimode-encoded signals having voltage levels according to the multimode encoding equation. At step 906, the multimode-encoded signals are decoded according to a multimode decoding equation to produce multimode-decoded signals. At step 908, the multimode-decoded signals are transmitted over the multichannel interconnect.

In one embodiment, the order of timing adjustment step 902 and encoding step 904 may be swapped. For example, the received binary-encoded inputs signals may be first encoded according to a multimode encoding equation such as described in step 904 to produce multimode-encoded signals, which may then be subjected to timing adjustment such as described in step 902 before being decoded as described in step 906.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for asymmetric multimode interconnect, the system comprising:
   a receiver for receiving binary-encoded input signals via a multichannel interconnect having a first end and a second end, the receiver including:
      a multimode encoder, connected to the second end of the multichannel interconnect, for receiving binary-encoded signals that correspond to binary-encoded input signals that were provided to the first end of the multichannel interconnect and encoding the received binary-encoded signals according to a multimode encoding equation to produce multimode-encoded electrical signals having voltage levels according to the multimode encoding equation, wherein the multimode-encoded electrical signals are produced by selecting an encoding matrix T such that the binary-encoded signals are encoded using fundamental eigenmodes of transmission line matrices;
      a timing adjustment block for adjusting the timing of the multimode-encoded electrical signals to compensate for channel delays of different channels of the multichannel interconnect and to produce delay-adjusted multimode-encoded electrical signals; and
      a multimode decoder for decoding the delay-adjusted multimode-encoded electrical signals according to a multimode decoding equation to produce binary-encoded output signals.

2. The system of claim 1 wherein the binary-encoded output signals are substantially equivalent to the binary-encoded input signals.

3. The system of claim 1 wherein the multichannel interconnect comprises a plurality of microstrip lines.

4. The system of claim 1 wherein the timing adjustment block comprises a sampling clock signal generator for generating sampling clock signals having delays that correspond to channel delays of the respective channels of the multichannel interconnect.

5. The system of claim 4 wherein the timing adjustment block comprises a plurality of latches for latching the multimode-encoded electrical signals at times specified by the sampling clock signals.

6. The system of claim 1 wherein the timing adjustment block comprises at least one of a voltage controlled delay circuit and a multiphase clock.

7. The system of claim 1 wherein the timing adjustment block comprises a plurality of analog to digital converters for converting the multimode-encoded electrical signals to digital values.

8. The system of claim 7 wherein the multimode decoder comprises a digital signal processor for processing the digital values according to a decoding algorithm to produce the binary-encoded output signals.

9. The system of claim 1 wherein the multimode encoder, the timing adjustment block and the multimode decoder comprise a plurality of operational latches, wherein each of the plurality of operational latches receives the received binary-encoded signals as input signals and produces as output the binary-encoded output signals according to a binary-encoding algorithm.

10. The system of claim 9 wherein the binary-encoding algorithm includes weighting coefficients for each of the input signals and wherein each of the plurality of operational latches applies to each of the input signals a respective weighting coefficient.

11. A system for asymmetric multimode interconnect, the system comprising:
    a transmitter for transmitting data over a multichannel interconnect having a first end and a second end, the transmitter including:
       a timing compensation block for receiving binary-encoded input signals and producing timing-compensated binary encoded input signals;
       a multimode encoder for encoding the timing-compensated binary encoded input signals according to a multimode encoding equation to produce multimode-encoded electrical signals having voltage levels according to the multimode encoding equation, wherein the multimode-encoded electrical signals are produced by selecting an encoding matrix T such that the binary-encoded signals are encoded using fundamental eigenmodes of transmission line matrices; and
       a multimode decoder for decoding the multimode-encoded electrical signals according to a multimode decoding equation to produce multimode-decoded signals and for transmitting the multimode-decoded electrical signals over the multichannel interconnect.

12. The system of claim 11 wherein the multimode decoder provides the multimode-decoded electrical signals to a first end of the multichannel interconnect and wherein the signals that appear at a second of the multichannel interconnect are substantially identical to the binary-encoded input signals.

13. The system of claim 11 wherein the multichannel interconnect comprises a plurality of microstrip lines.

14. The system of claim 11 wherein the multimode decoder includes a plurality of multilevel line drivers for driving the plurality of multimode-decoded electrical signals to their respective voltage levels according to the multimode-decoding equation.

15. The system of claim 11 wherein the timing compensation block produces timing-compensated binary encoded input signals by pre-adjusting the timing of the plurality of binary-encoded input signals to compensate for channel delays of different channels of the multichannel interconnect.

16. The system of claim 11 wherein the timing compensation block comprises a sampling clock signal generator for generating sampling clock signals having delays that correspond to channel delays of the respective channels of the multichannel interconnect.

17. The system of claim 11 wherein the timing compensation block comprises at least one of a voltage controlled delay circuit and a multiphase clock.

18. A method for asymmetric multimode interconnect, the method comprising:
- at a receiver connected to the second end of a multichannel interconnect having a first end and a second end:
  - receiving binary-encoded signals that correspond to binary-encoded input signals that were provided to the first end of the multichannel interconnect;
  - encoding the received binary-encoded signals according to a multimode encoding equation to produce multimode-encoded signals having voltage levels according to the multimode encoding equation, wherein the multimode-encoded electrical signals are produced by selecting an encoding matrix T such that the binary-encoded signals are encoded using fundamental eigenmodes of transmission line matrices;
  - adjusting the timing of the multimode-encoded signals to compensate for channel delays of each channel of the multichannel interconnect and to produce delay-adjusted multimode-encoded signals; and
  - decoding the delay-adjusted multimode-encoded signals according to a multimode decoding equation to produce binary-encoded output signals.

19. A method for asymmetric multimode interconnect, the method comprising:
- at a receiver connected to the second end of a multichannel interconnect having a first end and a second end:
  - receiving binary-encoded signals that correspond to binary-encoded input signals that were provided to the first end of the multichannel interconnect;
  - adjusting timing of the binary-encoded signals to compensate for channel delays of the different channels of the multichannel interconnect and to produce delay-adjusted binary-encoded signals
  - encoding the delay-adjusted binary-encoded signals according to a multimode encoding equation to produce delay-adjusted multimode-encoded electrical signals having voltage levels according to the multimode encoding equation, wherein the delay-adjusted multimode-encoded electrical signals are produced by selecting an encoding matrix T such that the delay-adjusted binary-encoded signals are encoded using fundamental eigenmodes of transmission line matrices; and
  - decoding the delay-adjusted multimode-encoded signals according to a multimode decoding equation to produce binary-encoded output signals.

20. A method for asymmetric multimode interconnect, the method comprising:
- at a transmitter connected to the first end of a multichannel interconnect having a first end and a second end:
  - receiving a plurality of binary-encoded input signals to be transmitted over the multichannel interconnect;
  - adjusting the timing of the plurality of binary-encoded input signals to compensate for channel delays of each channel of the multichannel interconnect;
  - encoding the timing-adjusted binary encoded input signals according to a multimode encoding equation to produce multimode-encoded signals having voltage levels according to the multimode encoding equation;
  - decoding the multimode-encoded signals according to a multimode decoding equation to produce multimode-decoded signals; and
  - transmitting the multimode-decoded signals over the multichannel interconnect.

21. A method for asymmetric multimode interconnect, the method comprising:
- at a transmitter connected to the first end of a multichannel interconnect having a first end and a second end:
  - receiving a plurality of binary-encoded input signals to be transmitted over the multichannel interconnect;
  - encoding the binary-encoded input signals according to a multimode encoding equation to produce multimode-encoded electrical signals having voltage levels according to the multimode encoding equation, wherein the multimode-encoded electrical signals are produced by selecting an encoding matrix T such that the binary-encoded signals are encoded using fundamental eigenmodes of transmission line matrices;
  - adjusting the timing of the plurality of multimode-encoded electrical signals to compensate for channel delays of the different channels of the multichannel interconnect;
  - decoding the multimode-encoded electrical signals according to a multimode decoding equation to produce multimode-decoded signals; and
  - transmitting the multimode-decoded signals over the multichannel interconnect.

22. A non-transitory computer readable medium having stored thereon executable instructions that when executed by the processor of a computer control the computer to perform steps comprising:
- at a receiver connected to the second end of a multichannel interconnect having a first end and a second end:
  - receiving binary-encoded signals that correspond to binary-encoded input signals that were provided to the first end of the multichannel interconnect;
  - encoding the received binary-encoded signals according to a multimode encoding equation to produce multimode-encoded electrical signals having voltage levels according to the multimode encoding equation, wherein the multimode-encoded electrical signals are produced by selecting an encoding matrix T such that the binary-encoded signals are encoded using fundamental eigenmodes of transmission line matrices;
  - adjusting the timing of the multimode-encoded electrical signals to compensate for channel delays of the different channels of the multichannel interconnect and to produce delay-adjusted multimode-encoded electrical signals; and
  - decoding the delay-adjusted multimode-encoded electrical signals according to a multimode decoding equation to produce binary-encoded output signals.

23. A non-transitory computer readable medium having stored thereon executable instructions that when executed by the processor of a computer control the computer to perform steps comprising:
- at a transmitter connected to the first end of a multichannel interconnect having a first end and a second end:
  - receiving a plurality of binary-encoded input signals representing data to be transmitted over the multichannel interconnect;
  - adjusting the timing of the plurality of binary-encoded input signals to compensate for channel delays of the different channels of the multichannel interconnect;
  - encoding the timing-adjusted binary encoded input signals according to a multimode encoding equation to produce multimode-encoded electrical signals having voltage levels according to the multimode encoding equation, wherein the multimode-encoded electrical signals are produced by selecting an encoding matrix T such that the binary-encoded signals are encoded using fundamental eigenmodes of transmission line matrices;

decoding the multimode-encoded electrical signals according to a multimode decoding equation to produce multimode-decoded signals; and transmitting the multimode-decoded electrical signals over the multichannel interconnect.

* * * * *